United States Patent
Fricout et al.

(10) Patent No.: US 10,859,370 B2
(45) Date of Patent: Dec. 8, 2020

(54) METHOD FOR THE FABRICATION OF A STEEL PRODUCT COMPRISING A STEP OF CHARACTERIZATION OF A LAYER OF OXIDES ON A RUNNING STEEL SUBSTRATE

(71) Applicant: ARCELORMITTAL, Luxembourg (LU)

(72) Inventors: Gabriel Fricout, Metz Devant les Ponts (FR); David Glijer, Metz (FR)

(73) Assignee: ARCELORMITTAL, Luxembourg (LU)

( * ) Notice: Subject to any disclaimer, the term of this patent is extended or adjusted under 35 U.S.C. 154(b) by 200 days.

(21) Appl. No.: 15/763,889

(22) PCT Filed: Sep. 30, 2016

(86) PCT No.: PCT/IB2016/055879
§ 371 (c)(1),
(2) Date: Mar. 28, 2018

(87) PCT Pub. No.: WO2017/056061
PCT Pub. Date: Apr. 6, 2017

(65) Prior Publication Data
US 2018/0283849 A1    Oct. 4, 2018

(30) Foreign Application Priority Data

Sep. 30, 2015 (WO) ............ PCT/IB2015/057496

(51) Int. Cl.
*G01B 11/06* (2006.01)
*G01N 21/84* (2006.01)
(Continued)

(52) U.S. Cl.
CPC ............ *G01B 11/0625* (2013.01); *B08B 3/08* (2013.01); *C23C 2/02* (2013.01); *G01N 21/3563* (2013.01);
(Continued)

(58) Field of Classification Search
CPC combination set(s) only.
See application file for complete search history.

(56) References Cited

U.S. PATENT DOCUMENTS 3,834,952 A  *  9/1974  Honjo et al. ............. C21D 8/12
                                                   148/112
5,074,924 A      12/1991  Ushioda et al.
(Continued)

FOREIGN PATENT DOCUMENTS

CN    1330575 A    1/2002
CN    101625425 A  1/2010
(Continued)

OTHER PUBLICATIONS

Machine translation of JP 10325755.*
(Continued)

*Primary Examiner* — Erin F Bergner
(74) *Attorney, Agent, or Firm* — Davidson, Davidson & Kappel, LLC

(57) ABSTRACT

A method for the fabrication of a steel product is provided. The method includes the steps of characterizing a layer of oxides present on a running steel substrate which includes providing a portion of the steel substrate comprising a layer of oxides and the portion defines an oxide surface, collecting light (Lr) from the oxide surface using a hyperspectral camera (20) in order to obtain intensity values ($I_{\lambda,M}$) respectively representative of an intensity of a part ($Lr_{\lambda,M}$) of the collected light, each part being respectively collected from one of a plurality of points (M) located on the oxide surface (Continued)

and respectively has a wavelength (λ) from a plurality of wavelengths, comparing the obtained intensity values with reference intensity values obtained for reference oxides, and calculating amounts of reference oxides in the layer. A device for characterizing a layer of oxides present on a steel substrate is also provided.

20 Claims, 7 Drawing Sheets

(51) Int. Cl.
 *B08B 3/08* (2006.01)
 *C23C 2/02* (2006.01)
 *G01N 21/3563* (2014.01)
(52) U.S. Cl.
 CPC . *G01N 21/8422* (2013.01); *G01N 2021/8411* (2013.01); *G01N 2021/8416* (2013.01); *G01N 2021/8427* (2013.01)

(56) References Cited

U.S. PATENT DOCUMENTS

| | | | |
|---|---|---|---|
| H0001925 H | 12/2000 | Stellman et al. | |
| 6,546,771 B1 | 4/2003 | Ljungars | |
| 6,646,264 B1 | 11/2003 | Modiano et al. | |
| 2007/0265783 A1 | 11/2007 | Mound | |
| 2013/0229516 A1* | 9/2013 | Jones | G01N 21/3563 348/143 |
| 2013/0292571 A1 | 11/2013 | Mukherjee et al. | |

FOREIGN PATENT DOCUMENTS

| | | |
|---|---|---|
| CN | 102507462 A | 6/2012 |
| JP | H08219891 A | 8/1996 |
| JP | H10206125 A | 8/1998 |
| JP | H10325755 A | 12/1998 |
| JP | 2013044729 A | 3/2013 |
| WO | 9627451 A1 | 9/1996 |
| WO | 0248687 A2 | 6/2002 |
| WO | WO2005083352 A1 | 9/2005 |

OTHER PUBLICATIONS

V.Mazet, Chemometrics and Intelligent Laboratory Systems, (2005), vol. 76, pp. 121-133.

Rodriguez S., et al., 'Automatic Slag Characterization based on Hyperspectral Image Processing', Proceedings of the 2010 IEEE 15th Conference on Emerging Technologies and Factory Automation, ETFA 2010, Sep. 13-16, 2010, Bilbao, Spain, 4 pages, Published Nov. 18, 2010 as per IEEE Xplore.

Corresponding Search Report for PCT/IB2016/055879.

Wieck,B et al.: "Multispectral Systems for Measuring the Radiation Parameters of the Steel Slag During the Discharge of Steelworks Furnace." In:"11th International Conferance on Quantitative InfraRed Thermography." Jun. 11, 2012.

Oh et al. "Comparison Between SiOC Thin Films Fabricated by Using Plasma Enhance Vapor Deposition and SiO2 Thin Films by Using Fourier Transform Infrared Spectroscopy", Journal of Korean Physical Society, vol. 56, No. 4, Apr. 2010, pp. 1150 to 1155.

* cited by examiner

METHOD FOR THE FABRICATION OF A STEEL PRODUCT COMPRISING A STEP OF CHARACTERIZATION OF A LAYER OF OXIDES ON A RUNNING STEEL SUBSTRATE

The present invention relates to a method for the fabrication of a steel product comprising a step of characterization of a layer of oxides present on a steel substrate, comprising the steps of collecting light from an oxide surface formed by the layer, and using the collected light in order to obtain the composition of this layer and optionally its thickness.

The invention also relates to an installation for treating a surface of a ferrous alloy strip, like a steel strip, for example in view of a galvanization treatment, comprising a device adapted to perform the method.

BACKGROUND OF THE INVENTION

Such oxides layer thickness for example ranges from ten to a few hundreds nanometers.

The heating of the steel strip during an annealing step, for example prior to a coating by galvanization, usually takes place in a direct-fired annealing furnace or a radiant tube annealing furnace. However, the use of these furnaces to heat the strip may lead to the formation of oxides on the surfaces of the strip, which are usually eliminated by additional pickling and/or shot blasting steps before coating. If not, the wettability of the liquid metal to be applied on the steel sheet surface may be too low, inducing bare spots on the steel surface.

This drawback is particularly met when the strip composition includes significant amounts of easily oxidized elements such as Si, Mn, Al, Cr, B, P and so on.

The contents over which this drawback may occur are about 0.5% in weight for Si, Mn, Al, P and Cr, and 5 ppm for B, if these elements are taken alone. But these limits may be sensibly lower when several of these elements are present in the steel. For example, an interstitial-free bake-hardenable steel with 0.2% of Mn, 0.02% of Si and 5 ppm of B may already undergo such wetting problems, due to the presence of B which rapidly diffuses up to the strip surface and makes Mn and Si oxides precipitate as continuous films.

Generally speaking, this risk of bad wetting by liquid metal is also met on all high strength steels, since they comprise at least one of said elements, like dual-phase steels, TRIP (TRansformation Induced Plasticity) steels, TWIP (TWining-Induced Plasticity) steels, electric steels and so on. For dual phase steels, the amount of Mn is generally lower than 3% by weight, with addition of Cr, Si or Al in an amount generally lower than 1% by weight. For TRIP steels, the Mn amount is generally lower than 2% by weight associated with maximum 2% by weight Si or Al. For TWIP steel, the Mn amount can be as high as 25% by weight, associated with Al or Si (max 3% by weight).

Low density steels containing notably Al and/or Si in large amounts (up to 10% by weight) are also sensitive to this phenomenon, as well as, for example, high Cr stainless steels for thermal treatments.

As a consequence, the detection and identification of an oxide layer on a steel strip is an important issue. Nowadays, the most commonly used technique to determine the type of oxide present on the surface of a steel substrate is infrared spectrometry, more precisely IRRAS (Infrared Reflection Absorption Spectrometry). It has the advantage of being nondestructive.

With such a technique, it is also possible to assess the thickness of the oxide layer. However, a preferred nondestructive optical technique for determining the thickness of a layer is nanometer ellipsometry.

Unfortunately, both infrared spectrometry and ellipsometry require a relatively long acquisition time, ranging from seconds to minutes, which does not allow implementing them on-line at a production facility.

Moreover most of the commonly known techniques do not allow to work either on a hot product, such as a product inside an annealing furnace, or on a cold product, such as a product at the exit of a pickling line.

BRIEF SUMMARY OF THE INVENTION

An object of the invention is to provide a method of characterizing a layer of oxides present on a steel substrate that solves or reduces at least some of the above mentioned issues, in particular that is faster and that can be implemented on-line at a production facility.

The present invention provides a method for the fabrication of a steel product comprising a step of characterization of layer of oxides formed on a running steel substrate, this step of characterization comprising the steps of:
providing a portion of the steel substrate comprising a layer of oxides wherein the portion defines an oxide surface,
collecting light (Lr) from said oxide surface using a hyperspectral camera in order to obtain intensity values ($I_{\lambda,M}$) respectively representative of an intensity of a part ($Lr_{\lambda,M}$) of the collected light (Lr), wherein each part ($Lr_{\lambda,M}$) is respectively collected from one of a plurality of points (M) located on said oxide surface and respectively has a wavelength ($\lambda$) from a plurality of wavelengths ($\lambda 1, \lambda 2, \ldots$),
comparing the obtained intensity values ($I_{\lambda,M}$) with reference intensity values ($R_{\lambda,M}$) obtained for reference oxides, and
calculating amounts of reference oxides in the layer.

In other embodiments, the method comprises one or several of the following features, taken in isolation or any technical feasible combination:
the step of calculating amounts of reference oxides includes the following sub steps of:
calculating reference absorbance values ($OA_{\lambda,M}$) using the reference intensity values ($R_{\lambda,M}$),
calculating absorbance values ($A_{\lambda,M}$) using the intensity values ($I_{\lambda,M}$);
the step of calculating the reference absorbance values ($OA_{\lambda,M}$) and the absorbance values ($A_{\lambda,M}$) includes expressing the reference absorbance values ($OA_{\lambda,M}$) and the absorbance values ($A_{\lambda,M}$) respectively as $$-\log_{10}\left(\frac{R_{\lambda,M} - D_{\lambda,M}}{W_{\lambda,M} - D_{\lambda,M}}\right) \text{ and } -\log_{10}\left(\frac{I_{\lambda,M} - D_{\lambda,M}}{W_{\lambda,M} - D_{\lambda,M}}\right),$$

wherein $D_{\lambda,M}$ represents a noise of the hyperspectral camera (20), $R_{\lambda,M}$ represents the reference intensity values ($R_{\lambda,M}$), $I_{\lambda,M}$ represents the intensity values, and $W_{\lambda,M}$ represents a white value;
the method comprises a calibration step to determine the noise $D_{\lambda,M}$ of the hyperspectral camera (20) and the white value $W_{\lambda,M}$;

the step of calculating amounts of reference oxides includes a baseline correction step;

the method comprises:

a step of calculating a parameter (B) representative of a surface of an area located under a curve, wherein said curve is obtained by plotting the absorbance values ($A_{\lambda,M}$) versus the plurality of wavelengths ($\lambda 1, \lambda 2, \ldots$), and a step of calculating a thickness (E) of said layer of oxides, wherein said thickness (E) is obtained as a function of at least said parameter (B);

said function is linear;

the method described hereabove comprises a step of determining said function for at least one of the reference oxides by using a plurality of reference oxide samples, wherein the plurality of reference oxide samples respectively comprise a substrate made of said steel and a layer of said at least one reference oxide deposited on the substrate, wherein said layers respectively have a plurality of thicknesses;

the incident light (Li) defines an angle ($\alpha$) with a direction (D) that is perpendicular to the oxide surface, and wherein the angle ($\alpha$) is comprised between 40° and 80°, preferably between 50° and 70°, and more preferably between 55° and 65°;

the collected light (Lr) and the reference collected light (Lrr) are obtained by spontaneous emission of light respectively by the oxide surface and by said surface made of said steel;

the plurality of wavelengths ($\lambda 1, \lambda 2 \ldots$) comprises wavelengths ranging from 8 µm to 12 µm;

all the wavelengths of the plurality of wavelengths ($\lambda 1, \lambda 2 \ldots$) are comprised between 8 µm to 12 µm;

the reference oxides include one or several of $SiO_2$, $SiO_xCH_y$, and amorphous $TiO_2$;

the method further comprises: after completion of the step of characterization of the oxide layer, a step of comparison of the obtained characterization of the oxide layer with one or several parameters representative of a specification of the oxide layer in order to obtain at least a comparison result; and if the comparison result is outside a predetermined range of allowance, an additional step of correction of the oxide layer;

the method is performed at the exit of a pickling line;

the method is performed at the exit of an annealing line; and the additional step of correction is a pickling of the steel substrate.

A targeted oxidation layer of the steel substrate may comprise targets in terms of thickness and/or composition of the oxide layer and may depend on the grade of the steel. The invention also deals with a device for characterizing a layer of oxides present on a steel substrate, comprising:

a hyperspectral camera adapted for collecting light (Lr) from an oxide surface of a portion of the steel substrate having a layer of oxides in order to obtain intensity values ($I_{\lambda,M}$) respectively representative of an intensity of a part ($Lr_{\lambda,M}$) of the collected light (Lr), wherein each part ($Lr_{\lambda,M}$) is respectively collected from one of a plurality of points (M) located on said oxide surface and respectively has a wavelength ($\lambda$) from a plurality of wavelengths ($\lambda 1, \lambda 2, \ldots$), means for comparing the obtained intensity values ($I_{\lambda,M}$) with reference intensity values ($R_{\lambda,M}$) obtained for reference oxides, and means for calculating amounts of reference oxides in the layer.

In other embodiments, the device comprises one or several of the following features, taken in isolation or any technical feasible combination:

the device comprises a light source, the light source being adapted to produce an infrared light; and the hyperspectral camera is a LWIR hyperspectral camera.

In other embodiments, the device comprises one or several of the following features, taken in isolation or any technical feasible combination:

the installation is a continuous galvanizing line; and the installation is a pickling line.

The invention also deals with an installation for treating a surface of a steel strip adapted to perform a method as described hereabove, and comprising a device adapted to perform the step of characterization as described above, the steel strip having a steel substrate and a layer of oxides present on the steel substrate.

BRIEF DESCRIPTION OF THE DRAWINGS

Other features and advantages of the invention will appear upon reading the following description, given by way of example and with reference to the accompanying drawings, in which.

DETAILED DESCRIPTION

Figure 1:
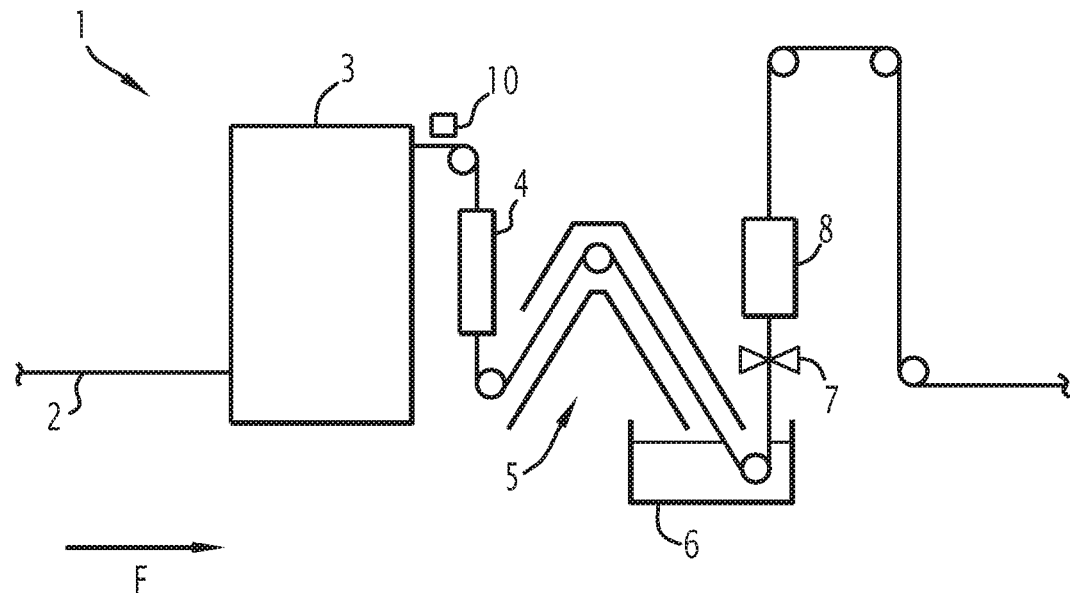
FIG. 1 is a schematic view of an installation according to the invention, for treating a steel strip.
Figure 2:
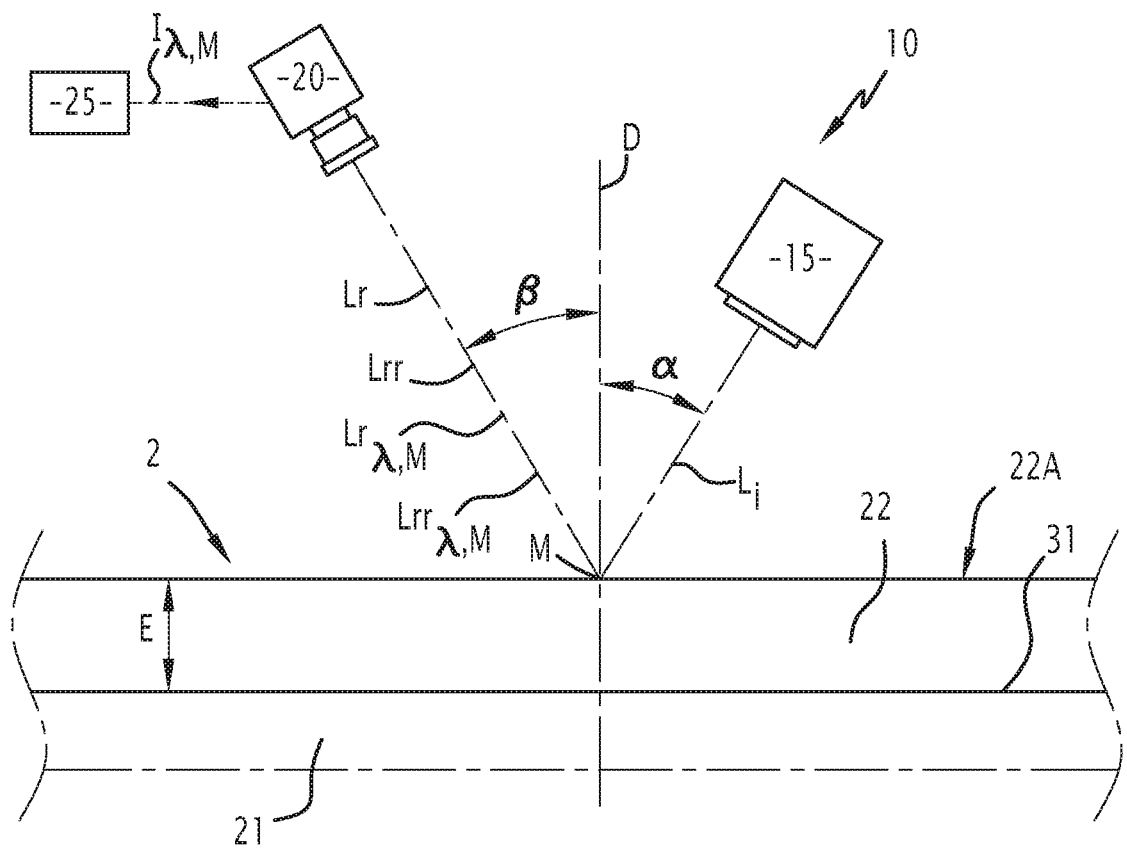
FIG. 2 is a schematic view of a device shown in FIG. 1 for performing a method according to the invention on the steel strip shown in FIG. 1

With reference to FIGS. 1 and 2, an installation 1 according to the invention will be described. The installation 1 is adapted for continuously treating a surface of a steel strip 2.

The installation 1 comprises an oven 3 for performing an annealing of the steel strip 2, and advantageously a cooling module 4. The installation 1 also comprises a coating module 5, such as a galvanization module, where the steel strip 2 is immersed into a bath 6 of molten zinc or zinc alloy.

At the exit of the coating module 5, the strip 2 goes through a wiping module 7 and a cooling module 8.

The steel strip 2 is for example of the above described type. The steel strip 2 runs along a direction F and passes through the installation 1, advantageously in a continuous manner. The steel strip 2 usually has a speed comprised between 150 m/min and 800 m/min. The steel strip 2 is subject to surface oxidation, particularly during the annealing process. During or after the annealing, the steel strip 2 comprises a steel substrate 21, and a layer 22 of oxides formed on the steel substrate 21.

The installation 1 also includes a device 10 for performing a characterization of the layer 22.

The layer 22 defines an oxide surface 22A directed at the device 10.

The layer 22 has a thickness for example ranging from ten to five hundreds nanometers.

According to several embodiments, the device 10 is located in the oven 3, or at an outlet of the oven 3 (as shown in FIG. 1). In another embodiment, not illustrated, the device 10 is located at the entrance or at the exit of a pickling line.

Figure 3A:
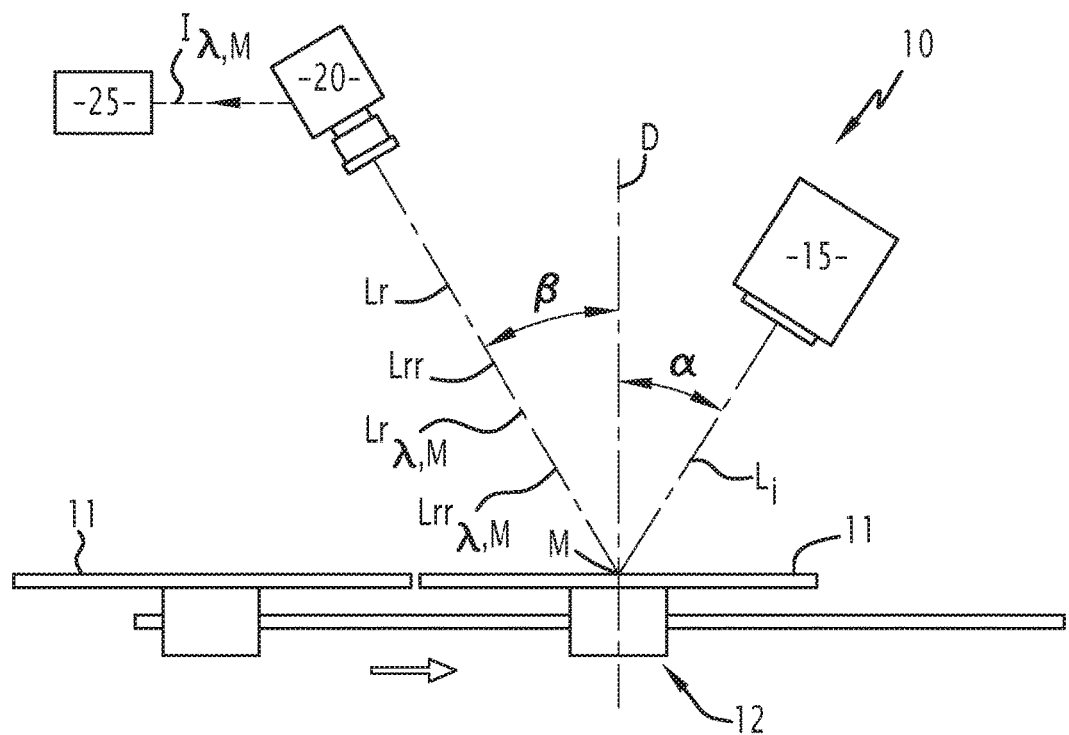
FIG. 3A is a schematic view of a device for performing a method according to the invention on a reference oxide sample.

With reference to FIGS. 2 and 3, there is described a device 10 for performing a method according to the invention. The device 10 is advantageously adapted to deal on-line with the steel strip 2 (FIG. 2), or with reference oxide samples 11 outside of the installation 1 (FIG. 3).

The device 10 comprises a hyperspectral camera 20, a light source 15 and a computer 25. In another embodiment the device 10 does not comprise a light source 15. When the device 10 is used with reference oxides samples, such as illustrated in FIG. 3, it further comprises a sample holding system 12.

The sample holding system 12 is adapted to hold the samples 11 and move them one by one with respect to the hyperspectral camera 20 to a work position represented in FIG. 3.

In both variants, as illustrated in FIGS. 2 and 3, the light source 15 is advantageously an infrared light source, for example comprising nickel/chromium shielded electric resistances. The light source 15 is advantageously focalized with gold mirrors. The light source 15 is suitable for directing an incident light Li towards a portion of the layer of oxide 22 with an incidence angle α with respect to direction D.

The portion receiving the incident light Li defines an oxide surface 22A, 122A.

The incidence angle α is advantageously comprised between 20° and 80°, preferably between 40° and 70°, and more preferably between 55° and 65°.

The hyperspectral camera 20 is adapted to collect a collected light Lr reflected by the oxide surface 22A, 122A at an observation angle β with respect to direction D on the other side of direction D with respect to the light source 15, and to produce intensity values $I_{\lambda,M}$ respectively representative of an intensity of a part $Lr_{\lambda,M}$ of the collected light Lr.

Each part $Lr_{\lambda,M}$ of the collected light Lr is respectively collected from a plurality of points M (of which only one is shown in FIGS. 2 and 3) located on the oxide surface 22A and respectively has a wavelength λ from a plurality of wavelengths λ1, λ2, . . . .

The intensity values $I_{\lambda,M}$ form a hyperspectral image of the oxide surface 22A obtained in a single step of collecting light. According to a variant, there is no light source 15 and the collected light Lr is obtained by spontaneous emission of light by the oxide surface 22A, for example when the steel strip 2 has a temperature above 350° C. This variant will be referred to as "emission mode", as opposed to a "reflection mode" wherein a light source is used.

Advantageously, the points M are to be understood as surfaces, for example of few square millimeters. The size of this surface will depend on the optical means used.

For example, the device 10 may be mainly placed at the outside of the furnace but have an optical fiber placed inside the furnace to collect the light emitted by the strip. The size of the surface is then dependent on the optical fiber diameter.

If the device 10 is located inside the furnace 3, the temperature of the steel strip 2 is around 800° C. So the steel strip 2 spontaneously emits light without requiring a light source such as the light source 15.

In the emission mode, the device 10 is adapted to collect the collected Lr from the emitted light at an observation angle β with respect to direction D, and to produce the intensity values $I_{\lambda,M}$.

By "hyperspectral", it is meant that the camera 20 is suitable for taking pictures of the samples or of the steel strip 2 at several distinct wavelengths at the same time. In other words, each picture taken by the camera 20 contains the plurality of wavelengths λ1, λ2, . . . .

In both modes, the hyperspectral camera 20 is advantageously a LWIR (Long Wave Infrared) hyperspectral camera, for example a Specim one.

The hyperspectral camera 20 for example has a spectral sensitivity at least from 8 μm to 12 μm.

The hyperspectral camera 20 comprises a digital sensor, installed behind a collection optics and a prism, or a spectrograph.

The sensor for example has a size of 380*50 pixels, respectively for the plurality of points M and the plurality of wavelengths λ1, λ2, . . . .

The frame rate of the hyperspectral camera 20 is for example 60 Hz.

In reflection mode, the observation angle β is advantageously comprised between 20° and 80°, preferably between 40° and 70°, and more preferably between 55° and 65°. Advantageously the observation angle β is approximately equal to the incidence angle α, so that the collected light Lr is actually obtained by specular reflection of the incident light Li.

The plurality of points M is advantageously regularly spaced along the strip width and for example has 380 points.

The plurality of wavelengths λ1, λ2 . . . comprises wavelengths ranging from 8 μm to 12 μm. Advantageously said wavelengths are all comprised between 8 μm to 12 μm.

The plurality of wavelengths λ1, λ2 . . . advantageously comprises values regularly distributed between 8 μm and 12 μm, for example thirty values.

The computer 25 is adapted to receive the intensity values $I_{\lambda,M}$ from the hyperspectral camera 20, to store them, and to perform calculations. The computer 25 also has means for human-computer interaction for example to display results.

With reference to FIGS. 1 to 12, a method 200 according to the invention will now be described. The method 200 aims at characterizing a layer 22 of oxide formed at the surface of the steel strip 2 by identifying its composition and optionally its thickness.

Depending on the constituent steel grade of the substrate and the coating to be deposited on the substrate, the skilled person establishes a specification for the oxide layer allowing it to form a coating having desired properties, such as coating thickness or coating adhesive properties required.

The skilled person can therefore determine target values for the parameters characterizing the oxide layer. Target values may be representative of a specification.

The target values may relate to the composition of the oxide layer, for example with a maximum weight percentage in a given reference oxide.

The target values may relate to the coating thickness. The thickness may depend on the composition.

A tolerance range around the target values can also be established.

In a reflection mode the incident light Li from the light source 15 is directed towards the portion of the layer 22 forming the oxide surface 22A.

In a first acquisition step 202 the collected light Lr is collected using the hyperspectral camera 20.

Only one acquisition is needed to obtain data at the plurality of wavelengths λ1, λ2, . . . .

The hyperspectral camera 20 delivers the intensity values $I_{\lambda,M}$ forming the hyperspectral image of the oxide surface 22A which are then sent to the computer 25.

Once the intensity values $I_{\lambda,M}$ acquired, the computer 25 performs a calculation step 204. This calculation step 204 consist in calculating absorbance values $A_{\lambda,M}$ respectively as $$A_{\lambda,M} = -\log_{10}\left(\frac{I_{\lambda,M} - D_{\lambda,M}}{W_{\lambda,M} - D_{\lambda,M}}\right),$$

wherein $D_{\lambda,M}$ represents a noise of the hyperspectral camera 20, also named dark reference value and $W_{\lambda,M}$ is a white reference value.

These dark $D_{\lambda,M}$ and white $W_{\lambda,M}$ reference values may be obtained in a dedicated calibration step 203.

This calibration step 203 includes a sub-step of periodic acquisition of a set of dark reference value $D_{\lambda,M}$ and white reference value $W_{\lambda,M}$. The dark reference value $D_{\lambda,M}$ is for example obtained from an image captured when the optical lens is covered. The white reference value $W_{\lambda,M}$ is obtained from a captured image of the steel substrate itself, without the layer of oxides.

This calibration step 203 may be performed once at the beginning of the production campaign or, in a preferred embodiment, it maybe regularly performed to update the reference values.

As a consequence, $(I_{\lambda,M}-D_{\lambda,M})/(W_{\lambda,M}-D_{\lambda,M})$ is equal to $10^{-A_{\lambda,M}}$ (ten power minus the opposite of the absorbance value).

As a variant, the absorbance values $A_{\lambda,M}$ are expressed using an analogous mathematical formula. For example, a different logarithm is used.

In a different embodiment, instead of the absorbance values $A_{\lambda,M}$, surface reflectance values $Re_{\lambda,M}$ or surface transmittance values $T_{\lambda,M}$ may be calculated during the calculation step 204 and used in the next steps.

Then the absorbance values $A_{\lambda,M}$ are compared, advantageously by the computer 25 itself, in a comparison step 206, with a plurality of reference oxide absorbance values $OA_{\lambda,M}$ in order to determine which of the reference oxides are present in the layer 22, and in which amounts.

These reference oxide absorbance values $OA_{\lambda,M}$ are expressed with the same formula as for the absorbance values, using reference intensity values $R_{\lambda,M}$ instead of the intensity values $I_{\lambda,M}$.

If surface reflectance values $Re_{\lambda,M}$ or surface transmittance values $T_{\lambda,M}$ are used instead of absorbance values $A_{\lambda,M}$ they would respectively be compared with reference surface reflectance values $ORe_{\lambda,M}$ and surface transmittance values $OT_{\lambda,M}$.

The intensity reference values $R_{\lambda,M}$, are obtained in the same manner as the intensity values $I_{\lambda,M}$, except that the incident light Li is directed towards reference oxide samples 11 instead of steel strip 2. The hyperspectral camera 20 then collects the reference collected light Lrr from the steel surface and provides the reference values $R_{\lambda,M}$.

The obtained reference values $R_{\lambda,M}$, are stored in the memory of the computer 25.

Figure 3B:
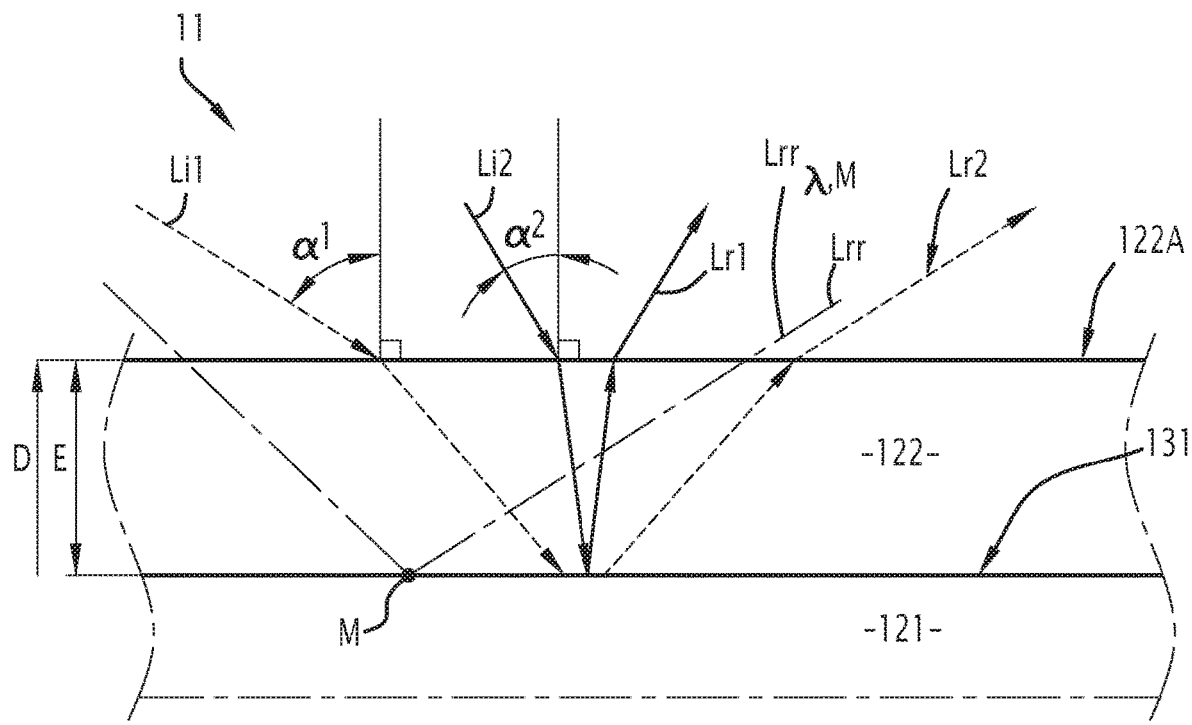
FIG. 3B is a schematic enlarged view of the reference oxide sample.

As shown in FIG. 3B, each reference oxide sample 11 comprises a steel substrate 121 and a layer of oxide 122.

The steel substrate 121 is for example a DWI steel used for packaging applications. The steel substrate 121 defines a steel surface 131 on which the layer of oxide 122 has been deposited, advantageously by physical vapor deposition (PVD).

The oxide constituting the oxide layer 122 is known.

Known types of oxide, here after reference oxides, for example include $CaO$, $SiO_2$, $MgO$, $Al_2O_3$, $Fe_2O_3+FeO$, $MnO$, $TiO_2$, $Na_2O$, $Cr_2O_3$, $BaO$, $SrO$, $P_2O_5$, $K_2O$, $ZrO_2$, $ZnO$, $CuO$, $SiO_xCH_y$.

To perform the comparison step 206, the computer 25 for example identifies which curve (C2, C4 and C6 in FIGS. 5 to 7) obtained by plotting the reference absorbance values $OA_{\lambda,M}$ as a function of the plurality of wavelengths λ1, λ2, . . . has similarities with the curve obtained by plotting the absorbance values $A_{\lambda,M}$ as a function of the plurality of wavelengths λ1, λ2, . . . in terms of shape and/or maximum and minimum absorbance values. It is also possible to compare an absorbance value $A_{\lambda,M}$ at a given wavelength λ.

For example, if the shape of the curve representative of the absorbance values $A_{\lambda,M}$ matches with curve C2, the oxide in point M is identified as $SiO_2$. If the shape of the curve representative of the absorbance values $A_{\lambda,M}$ matches with curve C4, the oxide at point M is identified as $SiO_xCH_y$. If it matches with curve C6, the oxide at point M is identified as amorphous $TiO_2$.

The identification of the oxides in each point M allows determining which oxides are present in the layer 22 of oxide and in which amount.

This comparison step 206 can also be performed using known algorithms, such as for example algorithms developed for source separation in spectroscopy.

Optionally, prior to the comparison step 206, the curve representative of the absorbance values $A_{\lambda,M}$ is submitted to a step 205 of base line correction. Indeed, the signal may be disrupted by a deviation of intensities in function of the wavelength, this phenomenon is known as baseline. This baseline correction step maybe performed manually or automatically using algorithms known by the skilled man, such as the one described in the document from V. Mazet et al. in *Chemometrics and Intelligent Laboratory Systems*, 2005, vol. 76, pp. 121-133.

Optionally, prior to the comparison, the curve representative of the absorbance values $A_{\lambda,M}$ is submitted to a step of un-mixing. This step is preferably used to determine the amount of oxides in the layer 22 of oxides.

The absorbance values $A_{\lambda,M}$ are the sum of the absorbance values of each type of pure oxide $A_{\lambda,M}(n)$ weighted by the quantity $\rho_n$ of this type of oxide in point M:

$$A_{\lambda,M}=A_{\lambda,M}(n1)\cdot\rho_{n1}+A_{\lambda,M}(n2)\cdot\rho_{n2}+A_{\lambda,M}(n3)\cdot\rho_{n3}\ldots.$$

Knowing the composition of the steel grade, it is possible to know which oxides are more likely to be present on the surface of the steel strip and so to know the absorbance values of each type of pure oxide $A_{\lambda,M}(n)$. The computer is then able to solve previous equation so as to determine the quantity $\rho_n$ of each type of oxide n at point M.

Other analytic methods which are known by the skilled person may be used to perform this un-mixing step, such as a Principal Component analysis (PCA), Vertex Component analysis (VCA) or Partial Least Square regression (PLS).

Optionally, in a further step 207, the thickness of the oxide layer 22 is determined. To do so, the computer 25 calculates the parameter B (FIG. 6) representative of the surface of the area located under the curve obtained by plotting the absorbance values $A_{\lambda,M}$ as a function of the plurality of wavelengths λ1, λ2, . . . .

The computer 25 then calculates the thickness E of the layer 22 using the parameter B and the thickness function (one of the curves C12, C13 and C14 in FIGS. 9 to 11) corresponding to the type of oxide that has been identified.

The thickness function for each reference oxide is either known from abaqus or has been determined using several reference oxide samples 11 with the same oxide type but with different oxide layer thickness E.

In another embodiment of the method, corresponding to the emission mode, in order to determine the presence and composition of the oxides in the layer 22, the signal representative of the surface state is isolated in the intensity values $I_{\lambda,M}$ using a known model, for example $S_{\lambda,M}=k_M \cdot Pl_{\lambda,T(M)}+f_{\lambda,M}$, wherein:

$T_M$ is the temperature of the steel strip 2 provided by an external device, such as a pyrometer, at point M, $Pl_{\lambda,T(M)}$ is Planck's law at wavelength λ and temperature $T_M$, $k_M$ is a coefficient pseudo-emissivity coefficient obtained by fitting Planck's law to the signal, and $f_{\lambda,M}$ is the value representative of the steel strip surface state.

$f_{\lambda,M}$ is obtained by fitting the model $k_M \cdot Pl_{\lambda,T(M)}+f_{\lambda,M}$ to the measured intensity values $I_{\lambda,M}$.

Then the values $f_{\lambda,M}$ are compared, advantageously by the computer 25, with reference oxide emission values $Of_{\lambda,M}$ in order to determine which ones of the reference oxides are present in the thin layer 22, and in which amounts.

Each of the reference oxide emission values $Of_{\lambda,M}$ is obtained in a similar manner as the reference oxide absorbance values $OA_{\lambda,M}$, using the reference oxide samples 11.

In the case where the device according to the invention is located in an annealing furnace, or at the outlet of the furnace, the characterization step of the invention allows determining the characteristics of the oxide layer present on the surface of the steel substrate.

These characteristics can then be compared with the previously determined target values. According to the result of this comparison and tolerance ranges, the steel substrate can then be sent directly to the galvanizing installation to be coated, be sent to a pickling facility in order to eliminate or reduce this oxide layer, or be discarded.

The method avoids obtaining coated steel products with defects, such as lack of coating or poor adhesion of the coating, thus enabling productivity gains.

Reference Samples

Twelve oxide reference samples with three different reference oxides, $SiO_2$, $SiO_xCH_y$, (x being comprised between 1 and 2 and y between 0 and 3) and amorphous $TiO_2$ and four different thicknesses E have been prepared. The steel constituting the substrate was a commercial DWI steel for packaging.

The thin layers of oxides have been deposited on the steel substrate by PVD.

The layer thicknesses and the oxide types have been controlled during manufacture.

In order to validate these parameters, different reference analyses have been performed in order to characterize the surface state of each oxide reference sample.

Then the oxide types have been confirmed by infrared spectrometry, for example using Nicolet 8700 spectrometer equipped with a variable angle accessory from Eurolab. The observation angle β was 80°.

50 spectrums with a 4 $cm^{-1}$ resolution have been acquired for each sample.

The reference sample providing the reference values $R_{\lambda,M}$ was of the same type of steel without oxide on the surface.

In order to confirm the oxide layer thicknesses, ellipsometric measurements have been carried out using a Horiba Jobin Yvon UVISEL. The angle of observation was 70°, in standard merge mode (I: M=0°; A=+45°-II: M=−45°; A=+45°) with 300 ms by point. The spectral range of analysis and of modelling was 500-800 nm (Delta=10 nm). The dispersion formula used for the thickness calculation was a classical model.

Information concerning the oxide reference samples is summarized in table 1.

TABLE 1

| Oxide reference samples | | |
|---|---|---|
| Sample number | Type of oxide | Thickness E nm |
| 1 | SiO2 | 25 |
| 2 | | 40 |
| 3 | | 52 |
| 4 | | 96 |
| 5 | $SiO_xCH_y$ | 41 |
| 6 | | 82 |
| 7 | | 132 |
| 8 | | 194 |
| 9 | $TiO_2$ | 35 |
| 10 | | 70 |
| 11 | | 110 |
| 12 | | 180 |

Figure 5:
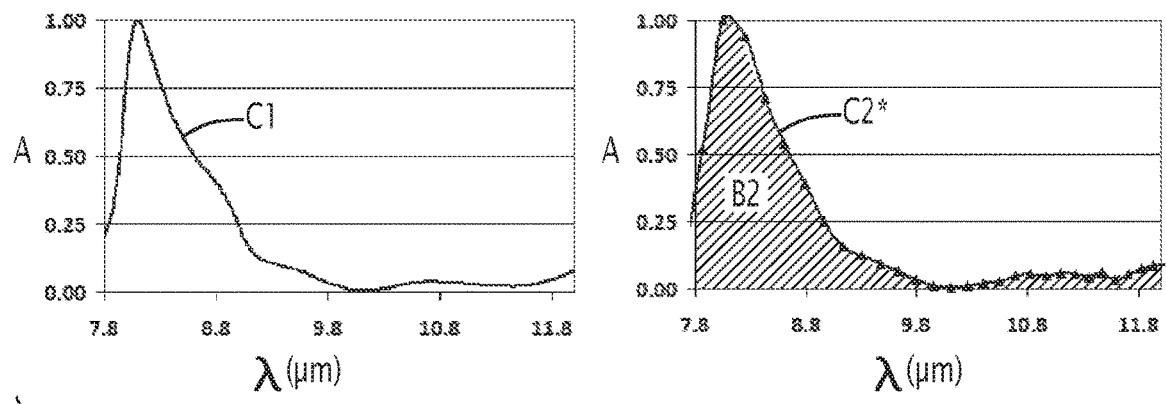
FIGS. 5 to 7 are three graphs showing absorbance values obtained with the device shown in FIG. 3 and three reference oxide samples respectively having thin layers of $SiO_2$, $SiO_xCH_y$, and amorphous $TiO_2$, and also showing absorbance values obtained with the same samples using a Fourier Transform Infrared (FTIR) spectrometer.
Figure 6:
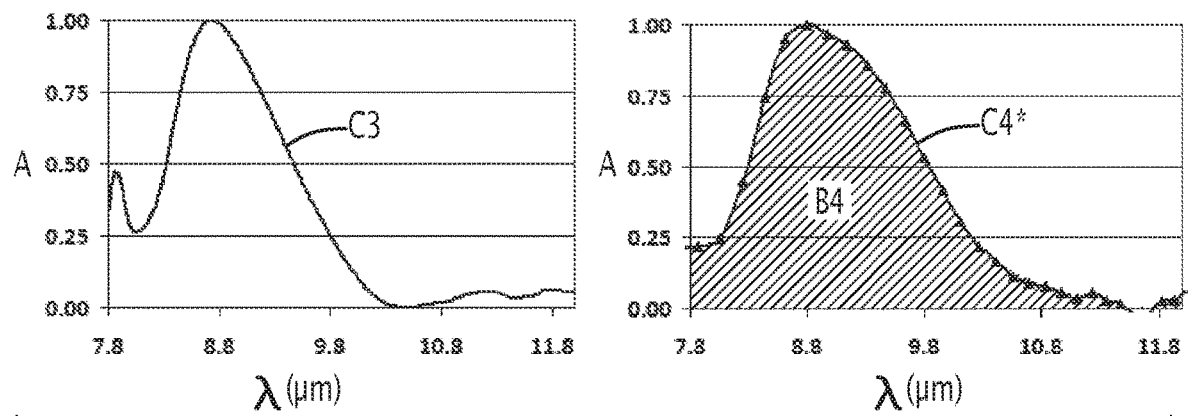
Figure 7:
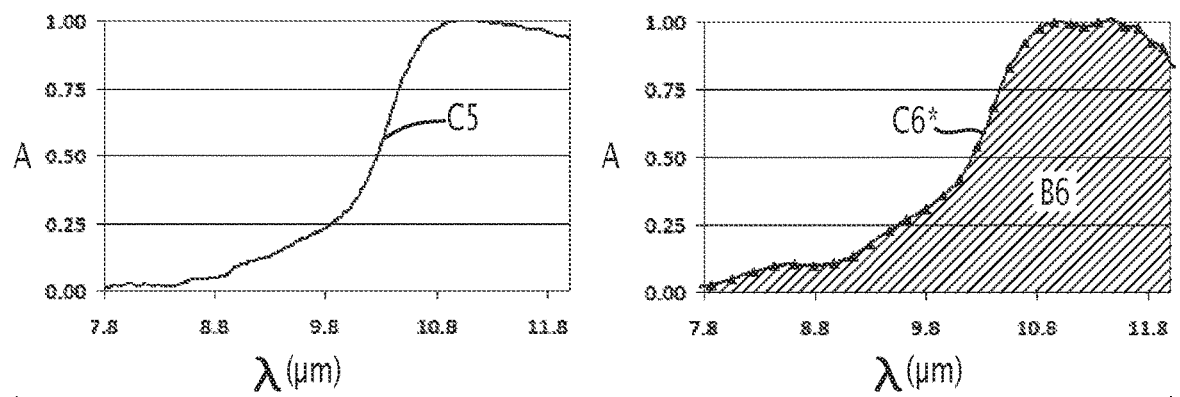

FIGS. 5 to 7 show the absorbance values A obtained by the method according to the invention versus the plurality of wavelengths λ1, λ2, . . . in μm, between 8 μm and 12 μm. The observation angle β was 60°, in specular reflection.

Curve C2 relates to sample 4 ($SiO_2$, 96 nm). Curve C4 relates to sample 6 ($SiO_xCH_y$, 82 nm). Curve C6 relates to sample 10 (amorphous $TiO_2$, 70 nm).

The graphs in FIGS. 5 to 7 also show absorbance curves C1, C3, C5 obtained with the same samples 4, 6, 10 using a classical FTIR spectrometry. Curve C1 relates to $SiO_2$. Curve C3 relates to $SiO_xCH_y$. Curve C5 relates to amorphous $TiO_2$.

The curves C1 to C6 relating to the same samples approximately have the same shape and the same maximum value. The minor differences between the curves are caused by different spectral resolutions (respectively 6 nm and 200 nm for FTIR spectrometer and the hyper spectral camera 20). Furthermore, the light source 15 was less focused than the FTIR spectrometer one.

The similarity of curves C2 with C1, C4 with C3, and C6 with C5 demonstrate the accuracy of the absorbance curves used by the method according to the invention.

Figure 8:
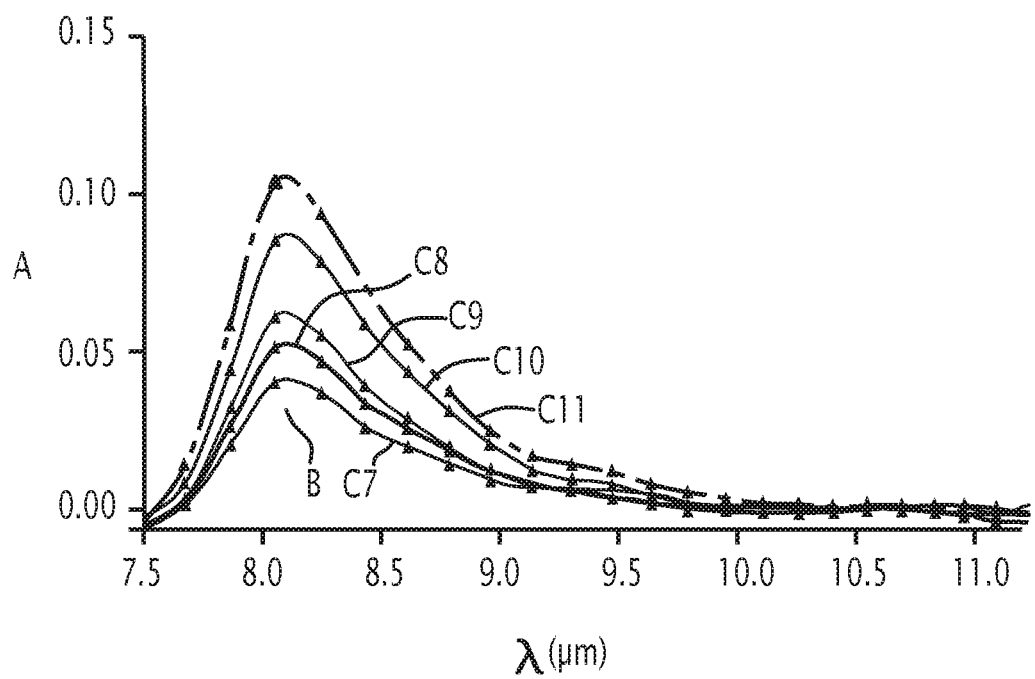
FIG. 8 is a graph showing several absorbance curves obtained with the device shown in FIG. 3 and a reference oxide sample having a thin layer of $SiO_2$, each curve corresponding to a different incidence angle of the incident light.

FIG. 8 shows the influence of the observation angle β, between 40° and 60°, on the absorbance values A obtained with sample 4 ($SiO_2$, 96 nm). Curve C7 was obtained with a 40° incidence, curve C8 with 45°, curve C9 with 50°, curve C10 with 55°, and curve C11 with 60°. The larger the observation angle β, the higher the absorbance values A at the same wavelength λ.

Figure 4:
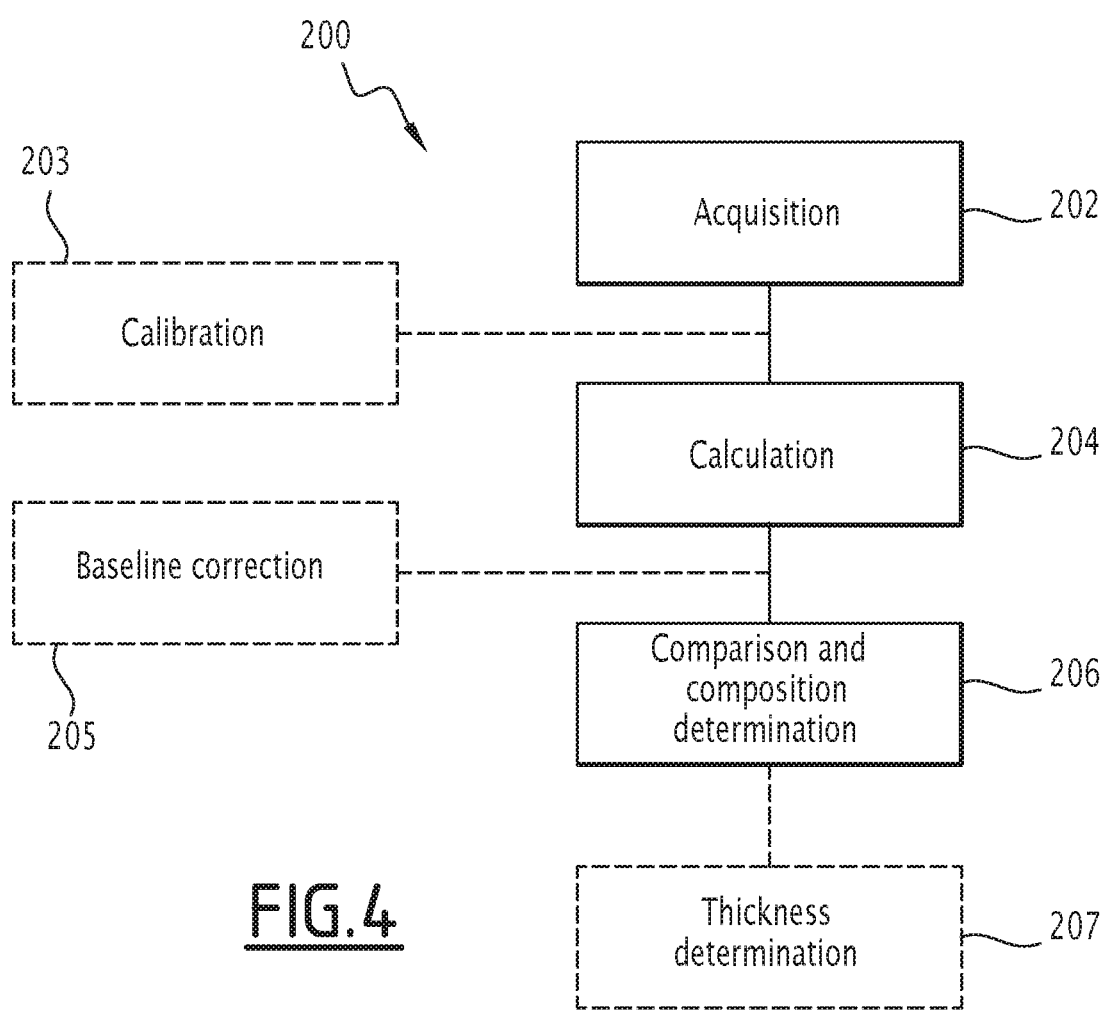
FIG. 4 is a diagram showing the main steps of an embodiment of a method according to the invention.

This is due to the fact that the larger the incidence angle α, the longer the path of light within the layer of oxide 122 as shown in FIG. 4. With an incident light Li1 having a larger incidence angle α1, the path from the incident light Li1 to a collected light Lr1 is longer than the path between an incident light Li2 and a collected light Lr2, the incident light Li 2 having a smaller incidence angle α2.

The observation angle β of 60° has been found optimal as it provides large absorbance values A, while being easy to implement in the device 10 shown in FIG. 3.

The area under the curve C11 (β equal to 60°) between 8 μm and 12 μm has provided the parameter B of sample 4 ($SiO_2$, 96 nm).

Figure 9:
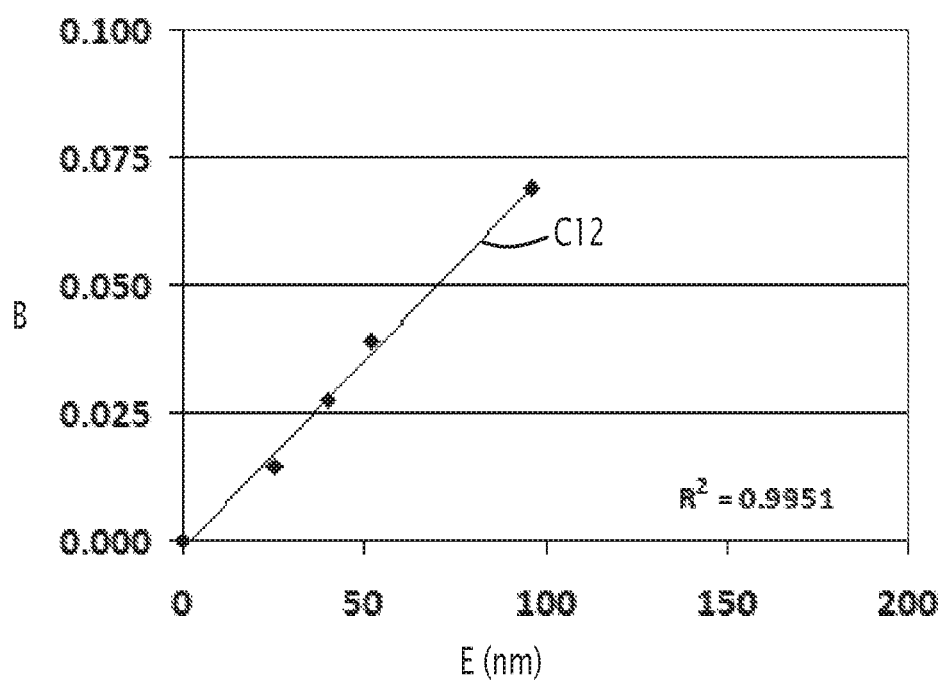
FIGS. 9 to 11 are three graphs showing a parameter obtained using the device shown in FIG. 3 and reference oxide samples, versus the thickness of the oxide layers, the oxide being respectively $SiO_2$, $SiO_xCH_y$, and amorphous $TiO_2$.
Figure 10:
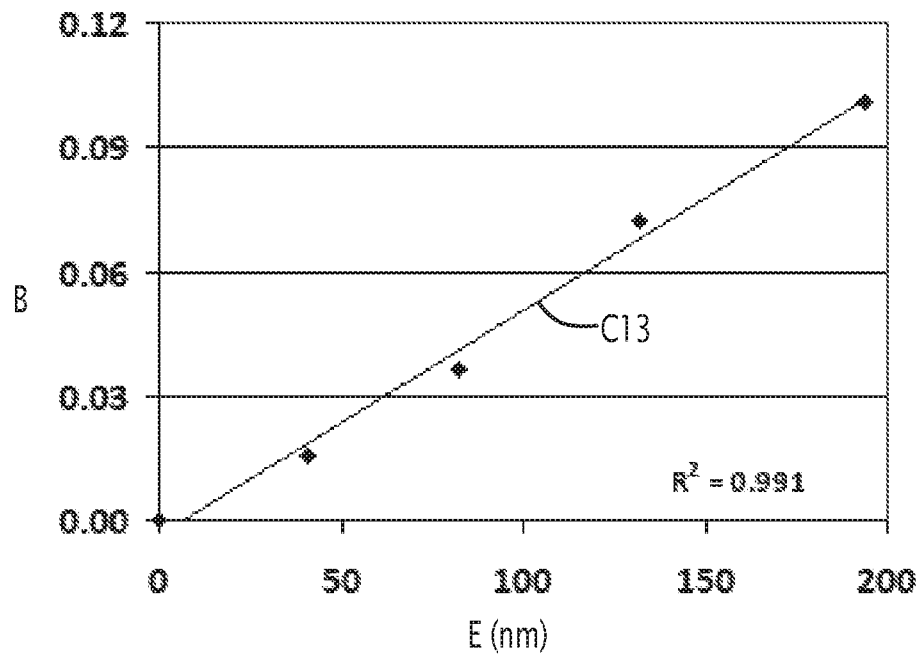
Figure 11:
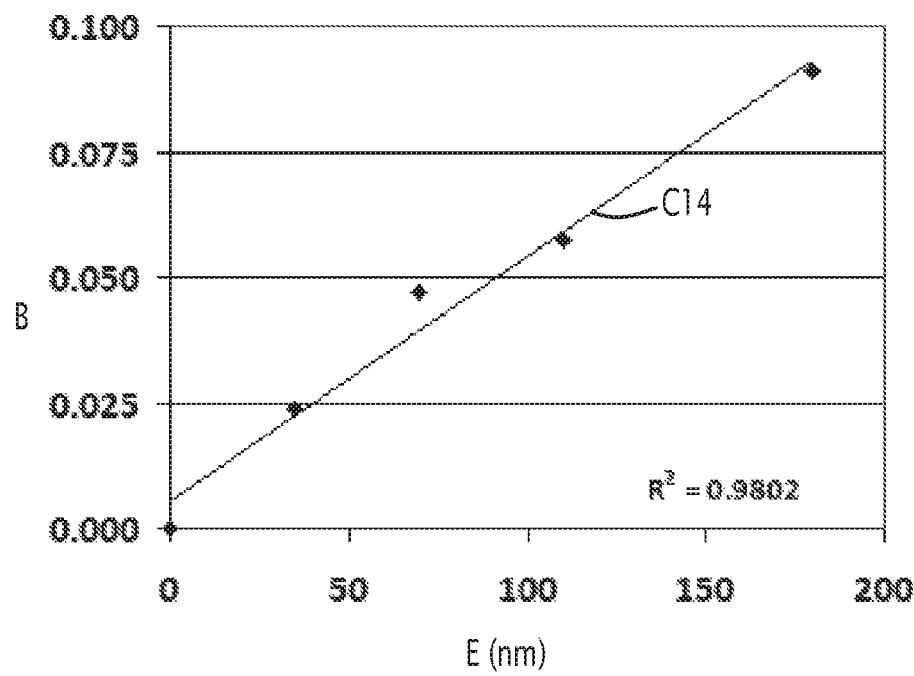

The parameters B of all the samples 1 to 12 have been calculated using the same 60° incidence angle α and are represented in FIGS. 9 to 11.

In FIG. 9, curve C12 is a linear regression performed on the B parameters of samples 1 to 4 ($SiO_2$) versus thickness E in nm.

In FIG. 10, curve C13 is a linear regression performed on the B parameters of samples 5 to 8 ($SiO_xCH_y$) versus thickness E in nm.

In FIG. 11, curve C14 is a linear regression performed on the B parameters of samples 9 to 12 (amorphous $TiO_2$) versus thickness E in nm.

The correlation coefficient obtained with curves C12 to C14 are respectively 0.9951, 0.991 and 0.9802. This shows that the linear functions corresponding to curves C12 to C14 allows assessing the thickness E based on the parameter B.

The computer 25, having the experimental points, performs these linear regressions in order to obtain linear functions for calculating the thickness E based on the parameter B in a very accurate manner.

Trial 1

A device 10, as previously described, composed of a hyperspectral camera and an optical fiber and linked to a computer was implemented on an industrial galvanizing line such as illustrated in FIG. 1. The hyperspectral camera was placed at the outside of the annealing furnace 3 inside a protective housing and an optical fiber linked to the hyperspectral camera was placed inside the annealing furnace 3. More specifically the optical fiber was placed at the end of the soaking area of the annealing furnace 3.

The method was so used in emission mode.

The strip being annealed was a TRIP 780 as commercialized by ArcelorMittal. This grade has a high content in Manganese which is easily oxidized.

The atmosphere in the annealing furnace was controlled so as to reach a Dew Point (DP) likely to imply external oxidation of the strip.

Figure 12:
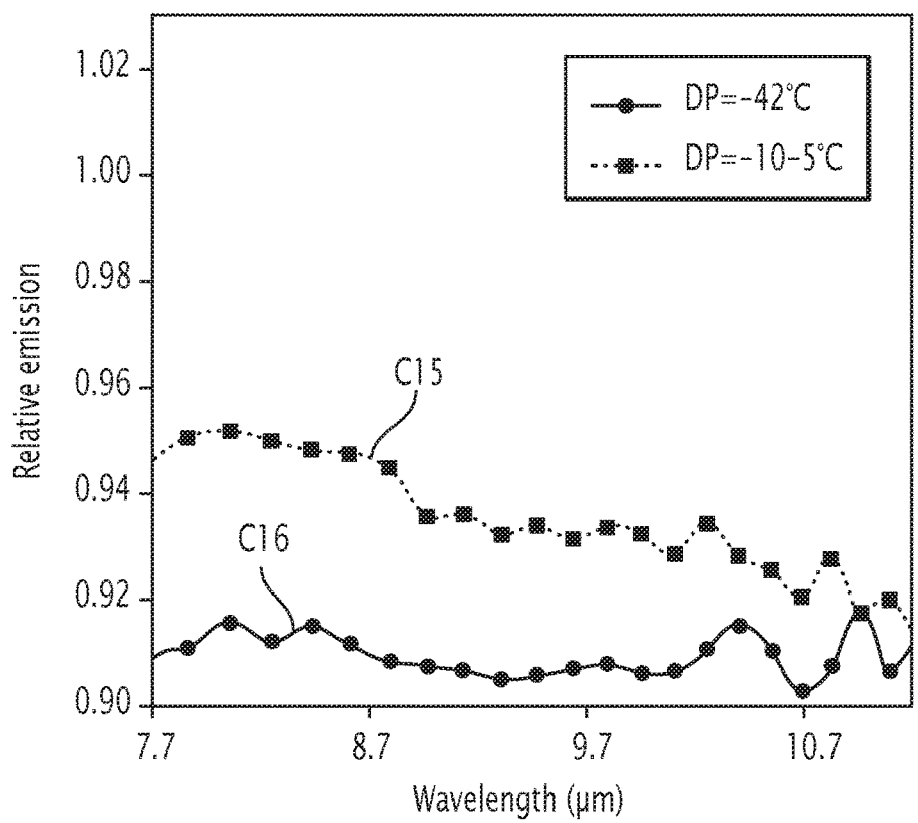
FIGS. 12 and 13 are graphs showing absorbance curves obtained with a method according to the invention.

The absorbance curves C15 and C16 obtained with the method according to the invention are represented in FIG. 12. In both case, the identified oxide is $MnAl_2O_4$.

Samples of the strip were then taken at the exit of the annealing furnace and analyzed to determine the composition of the oxide layers. The chemical analysis confirmed that the oxide layer at the strip surface was composed of $MnAl_2O_4$.

Trial 2

A device 10, as previously described, composed of a hyperspectral camera linked to a computer was implemented on an industrial galvanizing line such as illustrated in FIG. 1. The hyperspectral camera was placed at the end of the soaking area of the annealing furnace 3 inside a protective housing. The hyperspectral camera observes the moving steel strip.

Figure 13:
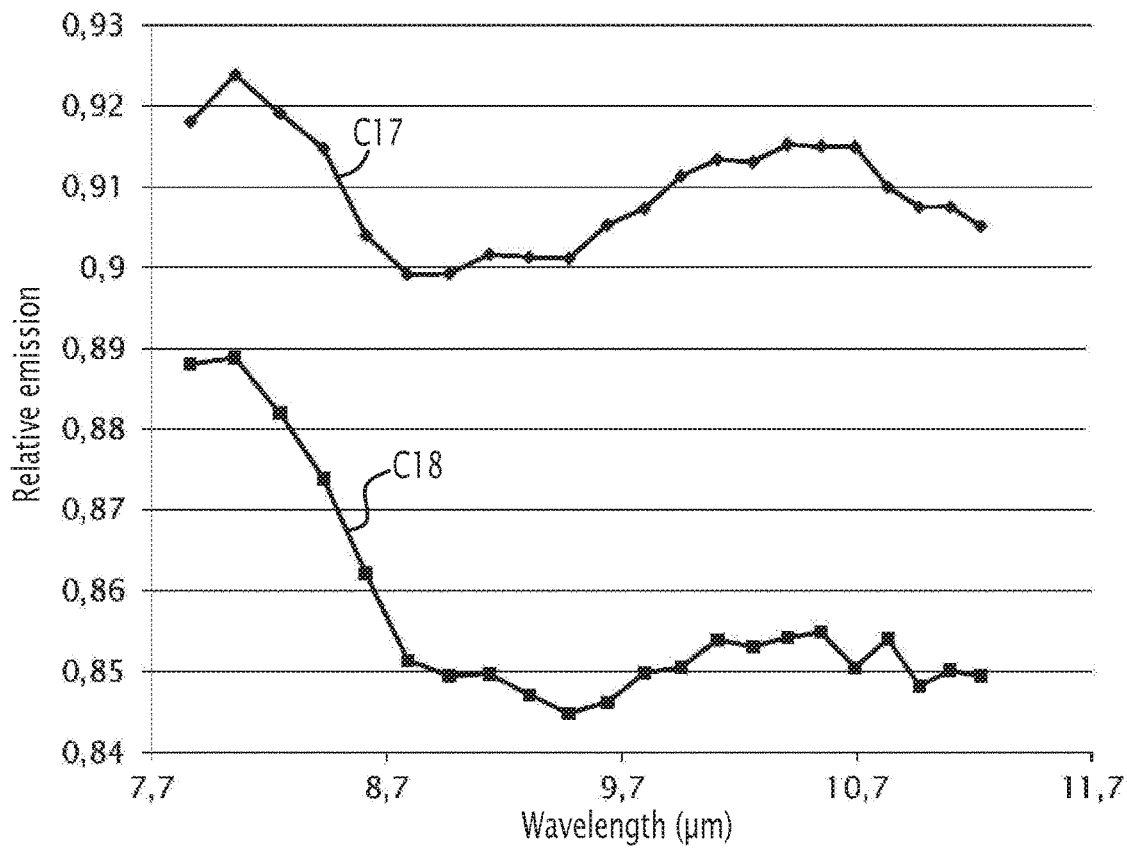

The method was so used in emission mode. The strip being annealed was a TRIP 780 as commercialized by ArcelorMittal. This grade has a high content in manganese and silicon which are easily oxidized. The atmosphere in the annealing furnace was controlled so as to reach a Dew Point (DP) likely to imply external oxidation of the strip. The absorbance curves C17 and C18 obtained with the method according to the invention are represented in FIG. 13.

In both cases, two types of oxides are identified: $SiO_2$ at 8 μm and $Mn_xSiO_y$ at 10-11 μm. Samples of the strip were then taken at the exit of the annealing furnace and analyzed to determine the composition of the oxide layers. The chemical analysis confirmed that the oxide layer at the strip surface was composed of $SiO_2$ and $Mn_xSiO_y$.

Thanks to the above described features, the method according to the invention is fast and is easily implemented at a production site. The characterization can be implemented on-line at a production site. The characterization provides accurate identification of the oxide layer 122 among several reference oxides and a composition of the layer 22 of the steel strip 2. Optionally, the characterization also provides an accurate evaluation of the thickness E of the layer 22.

It the device 10 is implemented in the oven or at the exit of the annealing furnace it allows to determine if the amount and thickness of oxides present on the surface of the steel strip 2 may induce wettability issues and so to take necessary steps such as downgrading of the strip.

It the device 10 is installed at the exit of a pickling line it allows to determine if the pickling step has been efficient to remove all oxides or if an additional pickling step is necessary.

The characterization step allows working either on a hot product, such as a product inside an annealing furnace, or on a cold product, such as a product at the exit of a pickling line.

What is claimed is:

1. A method for the fabrication of a steel product comprising a step of characterization of a layer of oxides present on a running steel substrate, this step of characterization comprising the steps of:

providing a portion of a steel substrate comprising a layer of oxides, the portion defining an oxide surface;

collecting light (Lr) from the oxide surface using a hyperspectral camera in order to obtain intensity values ($I_{\lambda,M}$) respectively representative of an intensity of a part ($Lr_{\lambda,M}$) of the collected light (Lr), wherein each part ($Lr_{\lambda,M}$) is respectively collected from one of a plurality of points (M) located on the oxide surface and respectively has a wavelength (λ) from a plurality of wavelengths (λ1, λ2, . . . );

comparing the obtained intensity values ($I_{\lambda,M}$) with reference intensity values ($R_{\lambda,M}$) obtained for reference oxides; and calculating amounts of reference oxides in the layer of oxides, wherein the calculating of the amounts of reference oxides includes:

calculating reference absorbance values ($OA_{\lambda,M}$) using the reference intensity values ($R_{\lambda,M}$), and calculating absorbance values ($A_{\lambda,M}$) using the intensity values ($I_{\lambda,M}$), wherein the calculating of the reference absorbance values ($OA_{\lambda,M}$) and the absorbance values ($A_{\lambda,M}$)

includes expressing the reference absorbance values ($OA_{\lambda,M}$) and the absorbance values ($A_{\lambda,M}$) respectively as $$-\log_{10}\left(\frac{R_{\lambda,M} - D_{\lambda,M}}{W_{\lambda,M} - D_{\lambda,M}}\right) \text{ and } -\log_{10}\left(\frac{I_{\lambda,M} - D_{\lambda,M}}{W_{\lambda,M} - D_{\lambda,M}}\right),$$

wherein $D_{\lambda,M}$ represents a noise of the hyperspectral camera, $R_{\lambda,M}$ represents the reference intensity values ($R_{\lambda,M}$), $I_{\lambda,M}$ represents the intensity values, and $W_{\lambda,M}$ represents a white value.

2. The method according to claim 1, comprising a calibration step to determine the noise $D_{\lambda,M}$ of the hyperspectral camera and the white value $W_{\lambda,M}$.

3. The method according to claim 1, wherein the step of calculating amounts of reference oxides includes a baseline correction step.

4. A method for the fabrication of a steel product comprising a step of characterization of a layer of oxides present on a running steel substrate, this step of characterization comprising the steps of:
  providing a portion of a steel substrate comprising a layer of oxides, the portion defining an oxide surface;
  collecting light (Lr) from the oxide surface using a hyperspectral camera in order to obtain intensity values ($I_{\lambda,M}$) respectively representative of an intensity of a part ($Lr_{\lambda,M}$) of the collected light (Lr), wherein each part ($Lr_{\lambda,M}$) is respectively collected from one of a plurality of points (M) located on the oxide surface and respectively has a wavelength ($\lambda$) from a plurality of wavelengths ($\lambda1, \lambda2, \ldots$);
  comparing the obtained intensity values ($I_{\lambda,M}$) with reference intensity values ($R_{\lambda,M}$) obtained for reference oxides; and
  calculating amounts of reference oxides in the layer of oxides,
  the method further comprising:
  calculating a parameter representative of a surface of an area located under a curve, the curve being obtained by plotting the absorbance values ($A_{\lambda,M}$) versus the plurality of wavelengths ($\lambda1, \lambda2, \ldots$); and
  calculating a thickness of the layer of oxides, the thickness being obtained as a function of at least the parameter.

5. The method according to claim 4, wherein the function is linear.

6. The method according to claim 4, further comprising a step of:
  determining the function for at least one of the reference oxides by using a plurality of reference oxide samples, wherein the plurality of reference oxide samples respectively comprises a substrate made of the steel and a layer of the at least one reference oxide deposited on the substrate, wherein the layers respectively have a plurality of thicknesses.

7. The method according to claim 1, wherein the incident light defines an angle ($\alpha$) with a direction that is perpendicular to the oxide surface, the angle ($\alpha$) being from 40° to 80°.

8. The method according to claim 1, wherein the collected light (Lr) and the reference collected light (Lrr) are obtained by spontaneous emission of light respectively by the oxide surface and by the surface made of the steel.

9. The method according to claim 1, wherein the plurality of wavelengths ($\lambda1, \lambda2, \ldots$) comprises wavelengths ranging from 8 μm to 12 μm.

10. The method according to claim 1, wherein all the wavelengths of the plurality of wavelengths ($\lambda1, \lambda2, \ldots$) range from 8 μm to 12 μm.

11. The method according to claim 1, wherein the reference oxides include at least one of $SiO_2$, $SiO_xCH_y$, and amorphous $TiO_2$.

12. The method according to claim 1, further comprising:
  after completion of the step of characterization of the oxide layer, a step of comparing the obtained characterization of the oxide layer with one or several parameters representative of a specification of the oxide layer in order to obtain at least a comparison result; and
  if the comparison result is outside a predetermined range of allowance, an additional step of correcting the oxide layer.

13. The method according to claim 12, wherein the method is performed at the exit of a pickling line or an annealing line.

14. The method according to claim 12, wherein the additional step of correction is a pickling of the steel substrate.

15. The method according to claim 4, wherein the incident light defines an angle ($\alpha$) with a direction that is perpendicular to the oxide surface, the angle ($\alpha$) being from 40° to 80°.

16. The method according to claim 4, wherein the collected light (Lr) and the reference collected light (Lrr) are obtained by spontaneous emission of light respectively by the oxide surface and by the surface made of the steel.

17. The method according to claim 4, wherein the plurality of wavelengths ($\lambda1, \lambda2, \ldots$) comprises wavelengths ranging from 8 μm to 12 μm.

18. The method according to claim 4, wherein all the wavelengths of the plurality of wavelengths ($\lambda1, \lambda2, \ldots$) range from 8 μm to 12 μm.

19. The method according to claim 4, wherein the reference oxides include at least one of $SiO_2$, $SiO_xCH_y$, and amorphous $TiO_2$.

20. The method according to claim 4, further comprising:
  after completion of the step of characterization of the oxide layer, a step of comparing the obtained characterization of the oxide layer with one or several parameters representative of a specification of the oxide layer in order to obtain at least a comparison result; and
  if the comparison result is outside a predetermined range of allowance, an additional step of correcting the oxide layer.

* * * * *